United States Patent [19]

Dubé

[11] Patent Number: 5,154,116
[45] Date of Patent: Oct. 13, 1992

[54] FORK SUPPORTING DEVICE FOR FONDUE POT

[76] Inventor: Julien H. Dubé, 12112, Ste-Gertrude, Montreal-North, Canada, H1G 5R2

[21] Appl. No.: 848,641

[22] Filed: Mar. 9, 1992

[51] Int. Cl.⁵ ............................................. A47J 37/12
[52] U.S. Cl. ....................................... 99/403; 99/413; 99/419; 99/421 V; 99/448; 126/43; 248/110; 248/689
[58] Field of Search .......................... 99/403, 410–417, 99/419, 421 R, 421 V, 421 A, 348, 448; 126/43; 248/110, 689; 211/125; 220/912; 219/432, 429, 459; D7/366

[56] References Cited

U.S. PATENT DOCUMENTS

| | | |
|---|---|---|
| 2,852,144 | 9/1958 | Reno ................................. 248/110 |
| 3,038,402 | 6/1962 | Singer ................................. 99/403 |
| 3,156,364 | 11/1964 | Wolcott ........................... 248/110 |
| 3,379,118 | 4/1968 | Perez ................................. 99/419 |
| 3,466,999 | 9/1969 | Yanez-Pastur et al. ............. 99/419 |
| 3,543,674 | 12/1970 | Kunze ............................... 99/403 |
| 3,681,568 | 8/1972 | Schaefer ......................... 219/432 |
| 3,810,605 | 5/1974 | Lambert ............................ 99/348 |
| 3,827,677 | 8/1974 | Meyerhoefer et al. .......... 248/689 |
| 3,980,264 | 9/1976 | Tomasik ........................... 248/110 |
| 4,366,750 | 1/1983 | Brown et al. .................. 99/421 V |

FOREIGN PATENT DOCUMENTS 0190369 8/1986 European Pat. Off. ............ 248/110
1429829 4/1967 Fed. Rep. of Germany ... 99/421 V

*Primary Examiner*—Timothy F. Simone
*Attorney, Agent, or Firm*—Roland L. Morneau

[57] ABSTRACT

A device for supporting forks adapted to be mounted over a fondue pot which has an opened top end surrounded by a peripheral ledge. The device includes a substantially vertical rod, a set of at least three legs extending radially from the rod, adjacent the lower end of the rod. Each leg has a hooking member at the end remote from the rod, that is, adapted to sit over the ledge of the pot and to removably grip the peripheral ledge of the pot. A disk-shaped plate is perpendicularly mounted on the rod adjacent the upper end of the rod. The plate is provided with a plurality of bays around its peripheral edge. Each bay is adapted to receive a fork over the pot in a substantially vertical direction. The plate is located at a level so that the forks are adapted to partly penetrate inside the pot and into the liquid in the fondue pot. The legs are adjustable in length to adjust to various dimensions of pots and are set on a horizontal plane. The plate is provided with a peripheral rim exceeding over the surface of the plate to retain the forks over the plate.

8 Claims, 3 Drawing Sheets

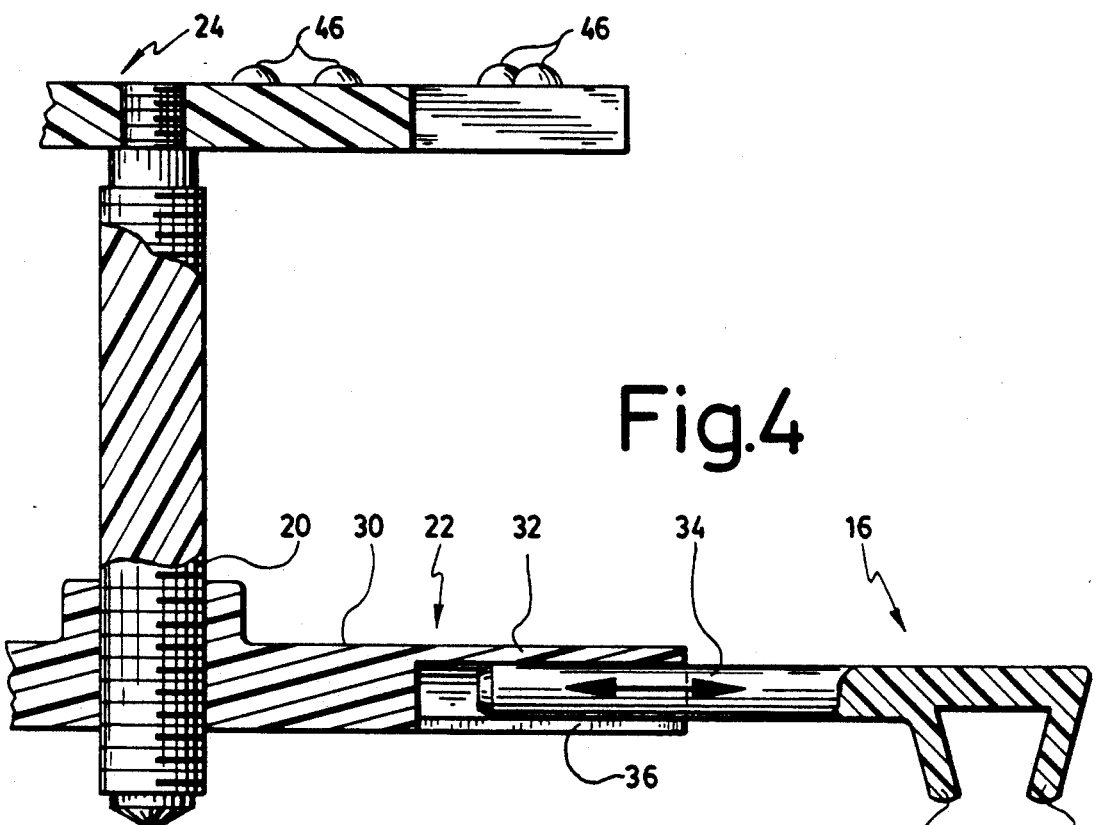
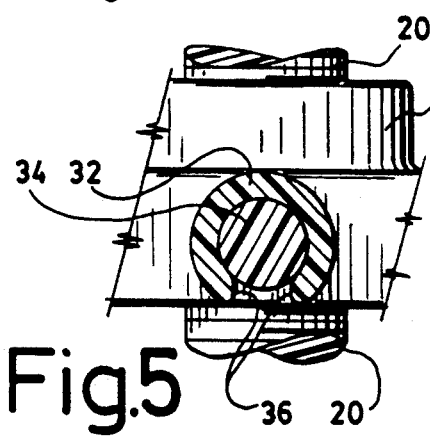
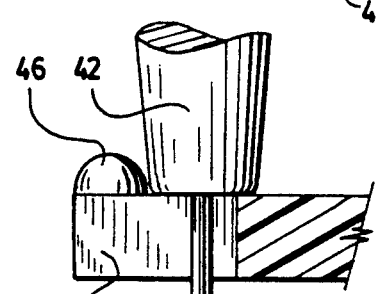
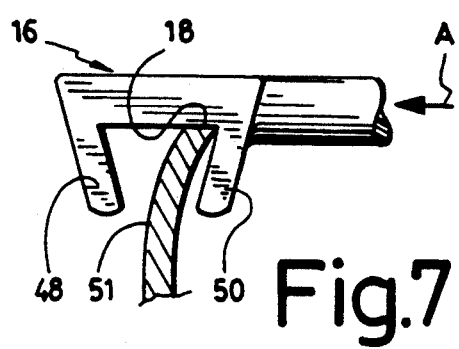
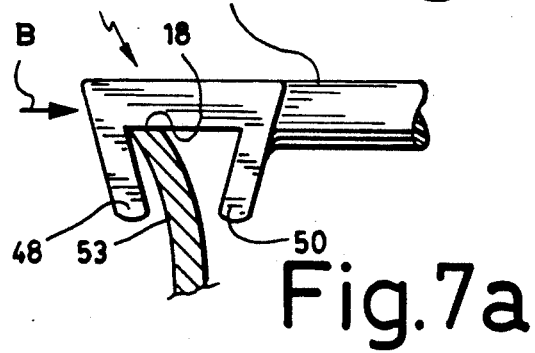

FORK SUPPORTING DEVICE FOR FONDUE POT

BACKGROUND OF THE INVENTION

1. Field of the Invention

The present invention relates to fork supporting device for fondue pot and in particular to a supporting device for hanging the forks vertically over the pot so that they do not intersect with each other. The device also allows the forks to be clearly identified and be easily picked up by each individual to whom a fork is assigned.

Furthermore, the device allows the user to pick up his fork without touching adjacent forks and in particular without causing splashing of hot liquid and tumbling of food which would be inserted in the tines of another fork.

2. Prior Art

A search of the prior art has failed to identify any pertinent reference regarding the present invention.

The common method for the usual fondue lovers consists of letting the tines of the fork rest on the bottom of the pot while the handle of the fork leans on the marginal upper edge of the pot. With such an arrangement, the forks intersect one against the other and the tines criss-cross in the pot. When two forks are interlaced and when the bottom one of the two is picked up without taking care of the superposed one, the latter fork may be projected out of the pot with the piece of food hooked to its tines. In addition, the usual hot liquid in the pot may spill over the table-cloth and even over the persons around the table.

The above mentioned disadvantages are overcome by the device according to the present invention.

SUMMARY OF THE INVENTION

The invention relates to a device for supporting forks mounted over a fondue pot which has an opened top end surrounded by a peripheral ledge. The device includes a substantially vertical rod, a set of at least three legs extending radially from the rod, adjacent the lower end of the rod. Each leg has a hooking member at the end remote from the rod, that is, adapted to sit over the ledge of the pot and to removably grip the peripheral ledge of the pot. A disk-shaped plate is perpendicularly mounted on the rod adjacent the upper end of the rod. The plate is provided with a plurality of indentations or bays around its peripheral edge. Each bay is adapted to receive a fork over the pot in a substantially vertical direction. The plate is located at a level so that the forks are adapted to partly penetrate inside the pot and into the liquid in the fondue pot.

The legs are particularly adjustable in length to adjust to various dimensions of pots and are preferably set on a horizontal plane. The plate is provided with a peripheral rim exceeding over the surface of the plate to retain the forks over the plate.

Furthermore, the rod is adapted to allow the legs and the plate to be adjustably spaced between each other so that the forks will hang at a suitable level in the pot.

BRIEF DESCRIPTION OF THE DRAWINGS

FIG. 4 is a cross-sectional view taken along line 4—4 of FIG. 3, FIG. 5 is a cross-sectional view taken along line 5—5 of FIG. 2, FIG. 6 is a cross-sectional view taken along line 6—6 of FIG. 3, and FIGS. 7 and 7a are side views of the hooking member mounted on two different types of fondue pots.

DETAILED DESCRIPTION OF THE INVENTION

Figure 1:
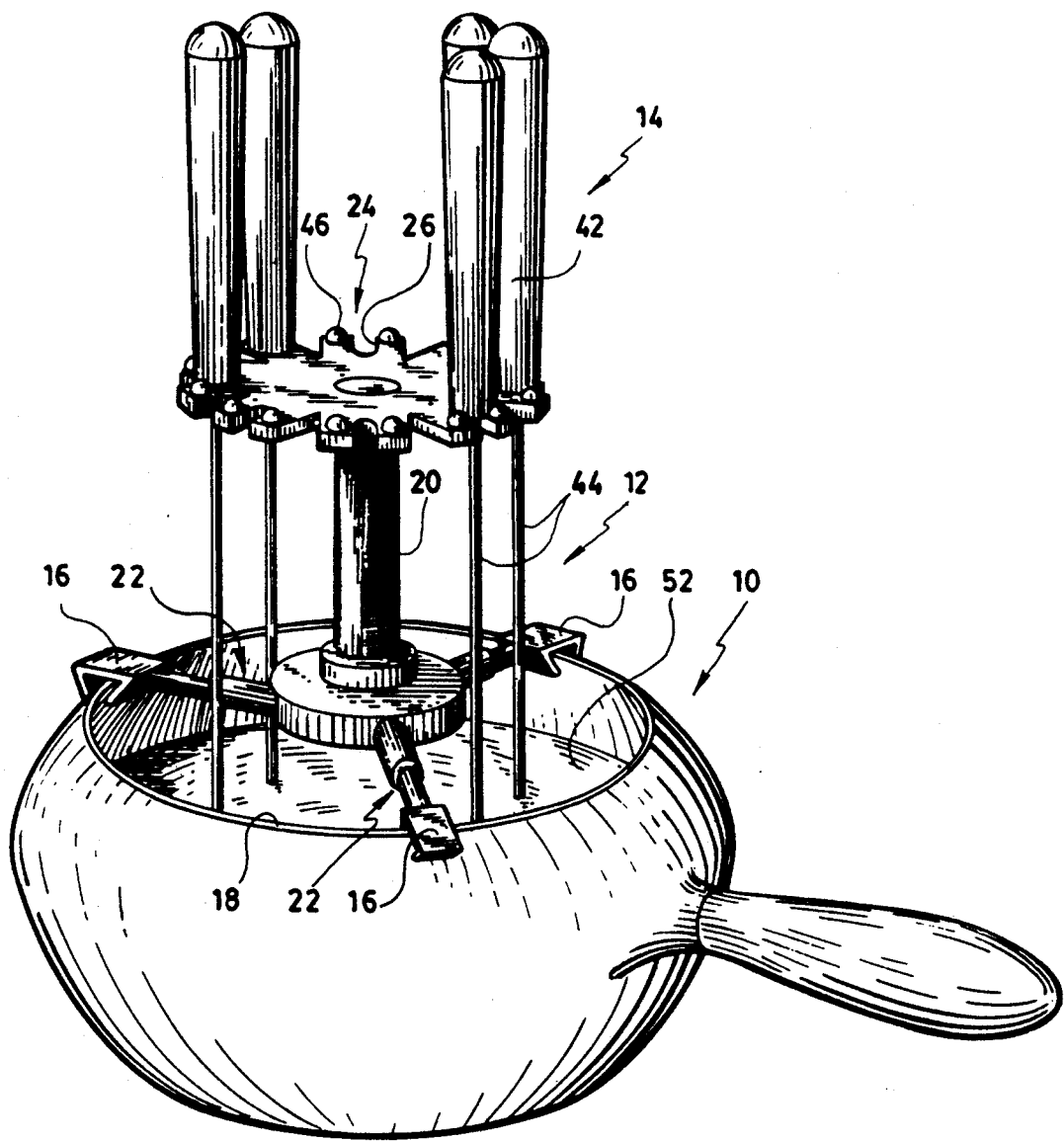
FIG. 1 is a perspective view of the fork supporting device for fondue pot mounted on a fondue pot.
Figure 2:
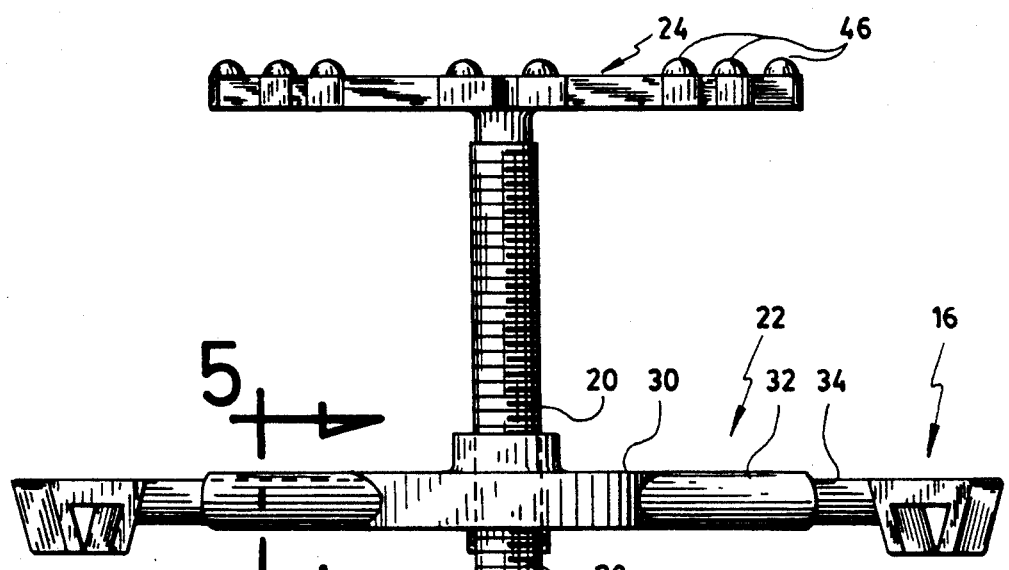
FIG. 2 is a side view of the fork supporting device shown in FIG. 1.

FIG. 1 illustrates a fondue pot 10 on which is mounted a supporting device 12 according to the invention on which hangs a set of forks 14. The fork supporting device is held to the fondue pot by a set of hooking members 16 resting on the peripheral ledge 18 of the fondue pot 10. The hooking members 16 are held to a central rod 20 by legs 22. A disk-shaped plate 24 is mounted at the upper end of the rod member 20 and is disposed substantially at right angle with the rod member 20. The disk-shaped plate 24 is provided with bays or indentations 26 on its periphery for supporting the forks 14.

The supporting device will now be more specifically described by referring to FIGS. 2 to 7. The legs 22 are connected to the rod 20 by a hub 30. The rod member 20 is provided with threads and the hub 30 is threadedly mounted on the hub so that it may be vertical adjustable thereon. It is understood that the hub 30 may be vertically adjustable on the rod member through various means although the threads have been selected as a simple and economical means for adjustment.

Figure 3:
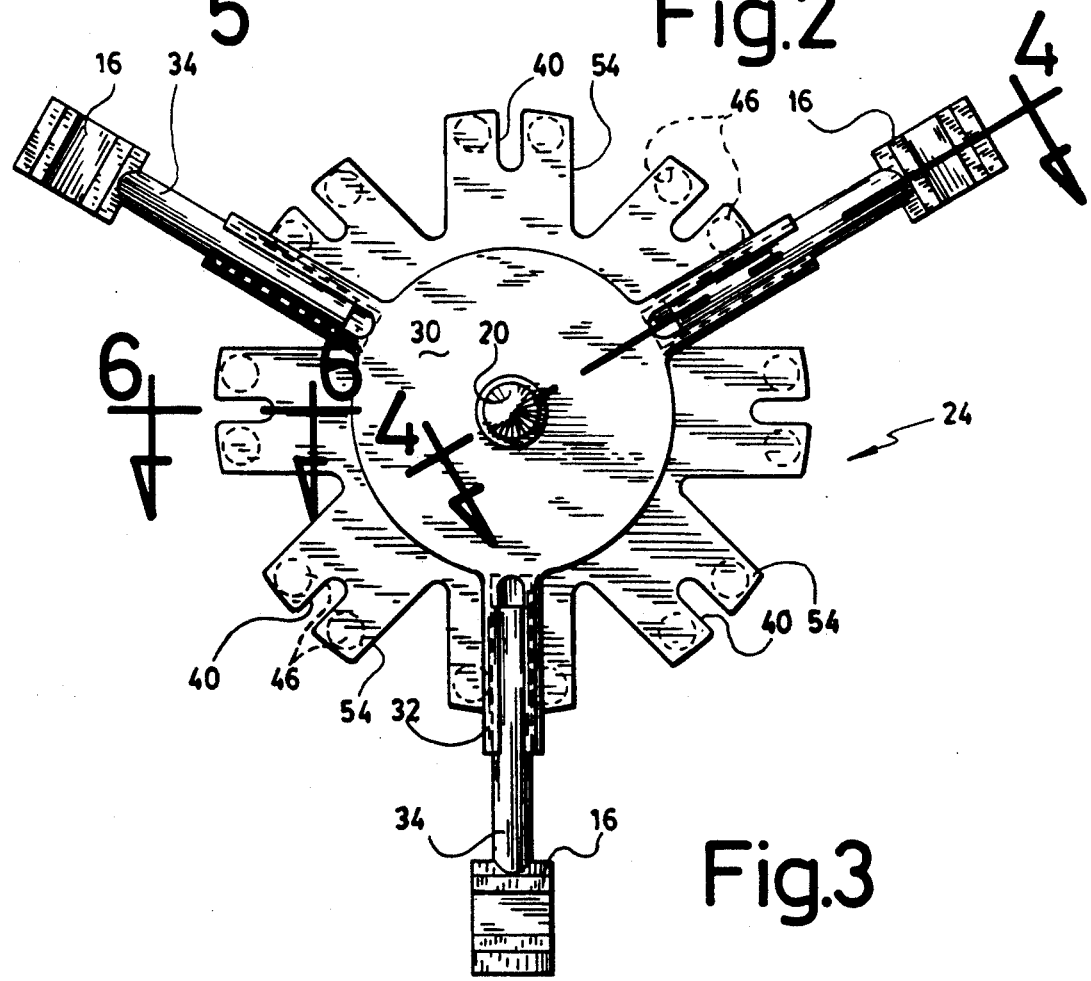
FIG. 3 is a bottom view of the device shown in FIG. 2.

The legs 22 are longitudinally adjustable so that the hooking member 16 can be adjusted to sit on a plurality of types of fondue pots having peripheral ledge 18 of different diameters. For this purpose, the leg members 22 includes a sleeve 32 through which is shaft 34 is adapted to fittingly slide therethrough. As particularly shown in FIG. 5, the sleeve 32 to provide a fittingly sliding adjustment for the shaft 34 which may be introduced through the slit 36 running along the bottom of the sleeve 32 as shown in FIG. 3. Such an arrangement does not require the production of the sleeve 32 with a high degree of precision to allow the desired tightness around the shaft 34. Considering that the material used for the combination of the sleeve 32 and the shaft 34 is a plastic having a low coefficient of friction, the sliding of the shaft 34 can be easily performed while any unintentional slipping through the sleeves 32 is prevented.

The disk plate 24 is threadedly mounted at the top of the rod member 20 and is adapted to be flush with the rod member so as to eliminate any possibility of food being caught into a recess at the center of the disk 24. The periphery of the plate 24 is provided with a plurality of bays or indentations 40 which are sufficiently narrow to support the handle 42 of the forks 14 and sufficiently wide to accept the introduction of the tines 44.

In addition, the plate 24 is also provided with a rim formed of a plurality of semi-circular beads 46 on each side of each indentation 40. The beads 46 are intended to retain the handle 42 inside the indentation 40 so that the fork 12 does not unintentionally drop out of its intended housing. As shown in FIG. 6, the indentations 40 are sufficiently deep so that the handle 42 rests behind the beads 46, that is, interiorly located in the direction of the center of the plate 24.

The end of each leg member 22 is provided with one of the hooking members 16 which are adapted to rest on the ledge 18 of the pot. The hooking member 16 has an upsidedown U-shaped or spur-shaped having two lateral teeth 48 and 50 for preventing the lateral sliding of the leg member 22 over the ledge 18 of the pot. The teeth 48 and 50 are preferably inwardly oriented to be particularly adapted over pots having concave and convex lateral sides. For instance, in FIG. 7, the hooking member 16 is mounted over a pot having a convex lateral wall 51 which will abut against tooth 50 when the shaft 34 is pushed in the direction of the arrow A. Such an arrangement can prevent the hooking member 16 from being raised upwardly. In FIG. 7a, the hooking member 16 is mounted over a pot having a concave lateral wall 53. In such case, the tooth 48 abuts against the ledge 18 of the pot when the shaft 34 is pushed in the direction of the arrow B. In this circumstance, the hooking member 16 is prevented also from being raised upwardly.

The relative dimensions of the hub member 30 and the plate 24 is such to allow the tines 44 of the forks 12 to be vertically hung into the hot liquid 52 in the pot 10. With this arrangement, each fork can be clearly identified, can be easily picked up by the users and can prevent them from being interlaced with one another. It is possible to let the fork hang while the piece of food is being cooked in the hot liquid 52 at the lower end of the fork 12.

In order to eliminate superfluous material around the plate 24, the latter may be cut out as shown by V-shaped indentations 54. Such indentations 54 do not weaken the plate 24 if the latter is sufficiently thick and made of a solid plastic material.

Although the device as previously described may be made of various types of material, suitable plastic standing high temperature and being sufficiently rigid to maintain their original shapes may be contemplated in the present invention. Polypropylene has been found suitable for the production of the present device.

I claim:

1. A fork supporting device adapted to be mounted on a fondue pot, said pot having an opened top end provided with a peripheral ledge, said device comprising a substantially vertical rod member, a set of at least three leg members radially extending from said rod member adjacent the lower end thereof, each leg member having a hooking member at the end remote from said rod member, said hooking member adapted to removably grip said peripheral ledge, a disk-shaped plate perpendicularly mounted adjacent the upper end of said rod member, said plate being provided with a plurality of indentations around its peripheral edge, each of said indentations adapted to hold a fork over said pot in a substantially vertical direction, said plate being at a level so that said forks are adapted to partly penetrate inside the pot.

2. A fork supporting device as recited in claim 1, wherein said leg members are longitudinally adjustable for allowing said device to be mounted on pots having ledges of different peripheral dimensions.

3. A fork supporting device as recited in claim 2, wherein said leg members comprise a sleeve portion having a C-shaped cross-section and a stem adapted to fittingly slide in said sleeve for longitudinally adjusting said leg members.

4. A fork supporting device as recited in claim 3, wherein said leg members are perpendicularly oriented relative to said rod members.

5. A fork supporting device as recited in claim 1, wherein said plate comprises a marginal rim projecting above said plate between said indentations, said rim adapted to retain said fork over said plate.

6. A fork supporting device as recited in claim 1, comprising means for variably spacing said plate from said leg members.

7. A fork supporting device as recited in claim 6, wherein said rod member has threads adjacent both ends thereof, said leg members are interconnected by a coupling member, said coupling member being provided with a threaded aperture for threadedly receiving said rod member, said plate being provided with a threaded hole centrally located relative to said peripheral edge, whereby said plate may be vertically adjusted relative to the leg members for selectively adjusting the penetration of the forks in the pot.

8. A fork supporting device as recited in claim 7, wherein said hooking member comprises a downwardly projecting spur member having inwardly projecting teeth, said teeth adapted to laterally abut against the peripheral ledge of the pot.

* * * * *